(No Model.)
A. EFFINGER & W. H. METZGER.
PRUNING SHEARS.
No. 530,221. Patented Dec. 4, 1894.
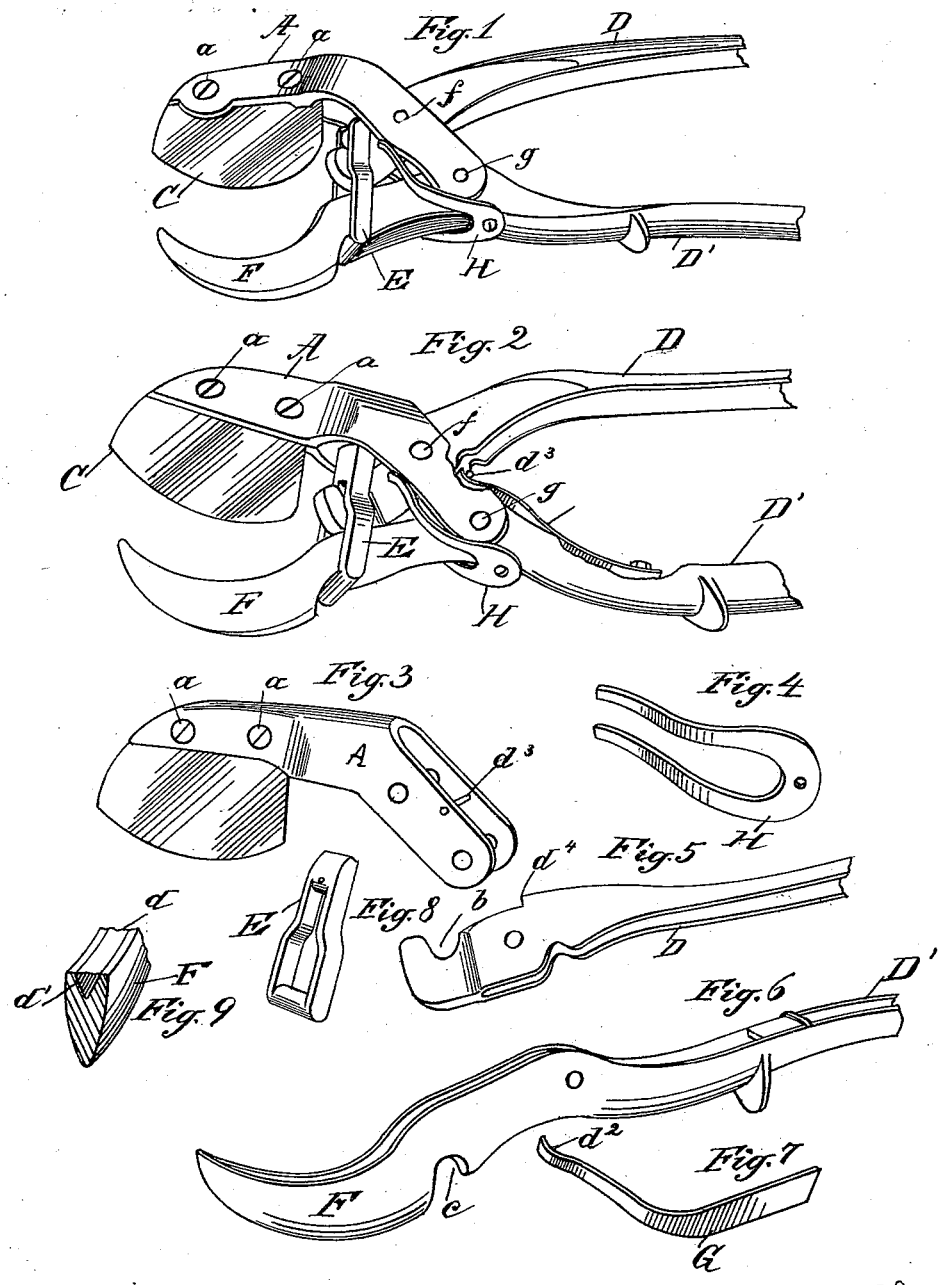

UNITED STATES PATENT OFFICE.

AUGUST EFFINGER AND WILLIAM H. METZGER, OF CANTON, OHIO.

PRUNING-SHEARS.

SPECIFICATION forming part of Letters Patent No. 530,221, dated December 4, 1894.

Application filed February 24, 1894. Serial No. 501,435. (No model.)

*To all whom it may concern:*

Be it known that we, AUGUST EFFINGER and WILLIAM H. METZGER, citizens of the United States, residing at Canton, in the county of Stark and State of Ohio, have invented certain new and useful Improvements in Pruning-Shears; and we do hereby declare that the following is a full, clear, and exact description of the same, reference being had to the annexed drawings, making a part of this specification, and to the letters of reference marked thereon, in which—

Figure 1, is a side view of the shears, showing the same opened. Fig. 2, is a similar view, showing the location of two springs. Fig. 3, is a detached view of the pivoted blade bar. Fig. 4, is a detached view of the outer spring. Fig. 5, is a detached view of the lever handle. Fig. 6, is a detached view of the link handle. Fig. 7, is a detached view of the inner spring. Fig. 8, is a detached view of the link for connecting the operating handles. Fig. 9, is a view, showing a portion of the link handle extension and that portion directly opposite the cutting blade, also showing a transverse section of said extension.

Similar letters of reference indicate corresponding parts in all the figures of the drawings.

The present invention has relation to pruning shears, and it consists in the different parts and combination of parts hereinafter described and particularly pointed out in the claims.

In the accompanying drawings A, represents the blade bar or yoke to which is securely attached by means of the rivets $a$ or their equivalents, the cutting blade C, which cutting blade is located substantially as illustrated in Figs. 1 and 2.

The blade bar or yoke A, is pivotally connected to the lever handle D and to the link handle D'. The lever handle D is provided with the notch or recess $b$, which notch or recess is arranged to engage one end of the link E.

The link handle D' is provided with the notch or recess $c$, which notch or recess engages the link E as illustrated in Figs. 1 and 2; said link connecting the handles D and D' together. The link handle D' is provided with the curved extension F, which curved extension acts as a jaw to hold the object designed to be cut in proper position to be acted upon by the blade C.

For the purpose of preventing the cutting edge of the cutting blade C from becoming dulled as it comes in contact with the extension or jaw F, the inner edge of said jaw is provided with the strip of soft metal $d$, which soft metal is placed in the groove $d'$.

It will be understood that various kinds of soft metal may be used for the purpose above described, but we prefer to use lead.

For the purpose of automatically opening the shears so as to receive the object designed to be cut, the springs G and H are provided. The spring G is securely attached in any convenient and well known manner to the link handle D', and its free end provided with the curved extension $d^2$, which curved extension embraces the pin $d^3$, substantially as illustrated in Fig. 2.

In use when the handles D and D' are brought toward each other by the operator, the notched end of the lever handle D will be carried away from the link handle D', which in turn brings the pivoted blade bar or yoke A, together with its blade toward the curved extension or jaw F, and when the handles are released the springs G and H will force the free ends of the handles apart, thereby opening the shears for the next cut. In the drawings we have illustrated two kinds of springs, both kinds of which are to be used in the manufacture of large sized shears, the object and purpose being to provide two springs of less strength so that the resistance of the springs will be better distributed, but in light shears, where a spring of less stiffness is required, but one spring is necessary, which may be of either kind shown.

It will be understood that the spring H acts upon the blade bar or yoke A, and is so adjusted and arranged to press the blade bar or yoke A away from the extension, or jaw F.

The rivet or bolt $f$, forms a fulcrum for the lever handle D, and the rivet $g$ forms a fulcrum for the link handle D'.

For the purpose of limiting the opening of the shears proper, the lever handle D is provided with the stop or shoulder $d^4$, which stop or shoulder engages with the blade bar A.

The pin $d^3$ is securely attached to the blade bar or yoke A, as illustrated in Fig. 3.

Having fully described our invention, what we claim as new, and desire to secure by Letters Patent, is—

1. The combination of the blade-bar or yoke A, having secured thereto the cutting blade C, the lever handle D, provided with the notch or recess $b$, the handle D' provided with the notch or recess $c$, and having the extension or jaw F provided with soft metal filling, the link E, and means for automatically opening the shears, substantially as and for the purpose specified.

2. The combination of the blade-bar or yoke pivotally connected to the handles D and D', the link E connected to the handles, a cutting blade and the springs G and H, substantially as and for the purpose specified.

3. The combination of the pivoted blade or yoke A, provided with a cutting blade, the handles D and D', the spring G provided with the curved extension $d^2$, the pin $d^3$ fixed to the bar A, the link E and the extension or jaw F, substantially as and for the purpose specified.

4. The combination of the pivoted bar or yoke A, provided with a cutting blade, the pivoted handles D and D', provided with the notches or recesses, the shoulder or stop $d^4$ the jaw F and the link E, substantially as and for the purpose specified.

In testimony that we claim the above we have hereunto subscribed our names in the presence of two witnesses.

AUGUST EFFINGER,
    WILLIAM H. METZGER.

Witnesses:
    F. W. BOND,
    E. A. C. SMITHE.